US011575569B2

(12) United States Patent
Rizvi et al.

(10) Patent No.: US 11,575,569 B2
(45) Date of Patent: Feb. 7, 2023

(54) HOST COMPUTING SYSTEMS PLACEMENT IN DATA CENTERS

(71) Applicant: VMWARE, INC., Pato Alto, CA (US)

(72) Inventors: Ammar Rizvi, Bangalore (IN); Anmol Parikh, Bangalore (IN); Niharika Narasimhamurthy, Bangalore (IN); Akash Kodenkiri, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 114 days.

(21) Appl. No.: 17/168,218

(22) Filed: Feb. 5, 2021

(65) Prior Publication Data

US 2022/0191093 A1 Jun. 16, 2022

(30) Foreign Application Priority Data

Dec. 10, 2020 (IN) .............................. 202041053848

(51) Int. Cl.
| | | |
|---|---|---|
| *H04L 41/0813* | (2022.01) | |
| *G06F 9/455* | (2018.01) | |
| *G06F 8/61* | (2018.01) | |
| *H04L 9/40* | (2022.01) | |
| *G06F 3/0482* | (2013.01) | |
| *H04L 9/32* | (2006.01) | |

(52) U.S. Cl.
CPC ........ *H04L 41/0813* (2013.01); *G06F 3/0482* (2013.01); *G06F 8/61* (2013.01); *G06F 9/45558* (2013.01); *H04L 9/3268* (2013.01); *H04L 63/123* (2013.01); *G06F 2009/45595* (2013.01)

(58) Field of Classification Search
CPC ......... G06F 2009/45595; G06F 3/0482; G06F 8/61; G06F 9/45558; H04L 41/0813; H04L 9/3268; H04L 63/123
USPC ........................................................ 709/220
See application file for complete search history.

(56) References Cited

U.S. PATENT DOCUMENTS

| | | | | |
|---|---|---|---|---|
| 2010/0282266 | A1* | 11/2010 | Sanchez ................. | G02B 5/223 623/4.1 |
| 2015/0222604 | A1* | 8/2015 | Ylonen ................. | H04L 9/3263 713/171 |
| 2017/0206034 | A1* | 7/2017 | Fetik ..................... | G06F 3/0604 |
| 2019/0188014 | A1* | 6/2019 | Easterling ........... | G06F 9/45533 |
| 2020/0137093 | A1* | 4/2020 | Janakiraman ....... | H04L 63/0263 |
| 2021/0117425 | A1* | 4/2021 | Rao ........................ | G06F 8/61 |
| 2021/0132975 | A1* | 5/2021 | Chandrashekar ....... | G06F 21/53 |
| 2022/0109570 | A1* | 4/2022 | Fang ................... | H04L 63/0428 |

* cited by examiner

*Primary Examiner* — Frantz B Jean

(57) ABSTRACT

A host computing system may include a processor and a memory coupled to the processor. The memory may include an auto-discovery module to broadcast a message to a set of management nodes in a data center. The message may include a configuration policy. Further, the auto-discovery module may receive an acknowledgment message from a management node. The acknowledgment message may indicate that the management node supports the configuration policy. Furthermore, the auto-discovery module may establish a trust relationship with the management node in response to receiving the acknowledgment message. Further, the auto-discovery module may enable the host computing system to add to a cluster managed by the management node upon establishing the trust relationship.

20 Claims, 7 Drawing Sheets

HOST COMPUTING SYSTEMS PLACEMENT IN DATA CENTERS

RELATED APPLICATIONS

Benefit is claimed under 35 U.S.C. 119(a)-(d) to Foreign Application Serial No. 202041053848 filed in India entitled "HOST COMPUTING SYSTEMS PLACEMENT IN DATA CENTERS", on Dec. 10, 2020, by VMware, Inc., which is herein incorporated in its entirety by reference for all purposes.

TECHNICAL FIELD

The present disclosure relates to data centers, and more particularly to methods, techniques, and systems for automatically placing a host computing system in a cluster managed by a management node in the data center.

BACKGROUND

A virtual computing instance (VCI) (e.g., a virtual machine (VM), a virtual workload, a data compute node, a cluster, a container, and the like) is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor (e.g., a server or host computing system) provisioned with a pool of computing resources (e.g., processing resources, memory resources, and the like). Multiple VCIs can be configured to be in communication with each other in a distributed computing system (e.g., a software defined data center).

Such software defined data centers may include multiple clusters of host computing systems. In a cluster, a group of host computing systems may be pooled together to share resources in managing multiple virtual machines (VMs), for instance. Further, such clusters may be managed by management servers to provide a single point of control to the corresponding host computing systems. For example, the management server may be assigned to the host computing systems in a cluster or a set of clusters to provide data center services such as access control, performance monitoring, configuration, and the like.

Figure 1:
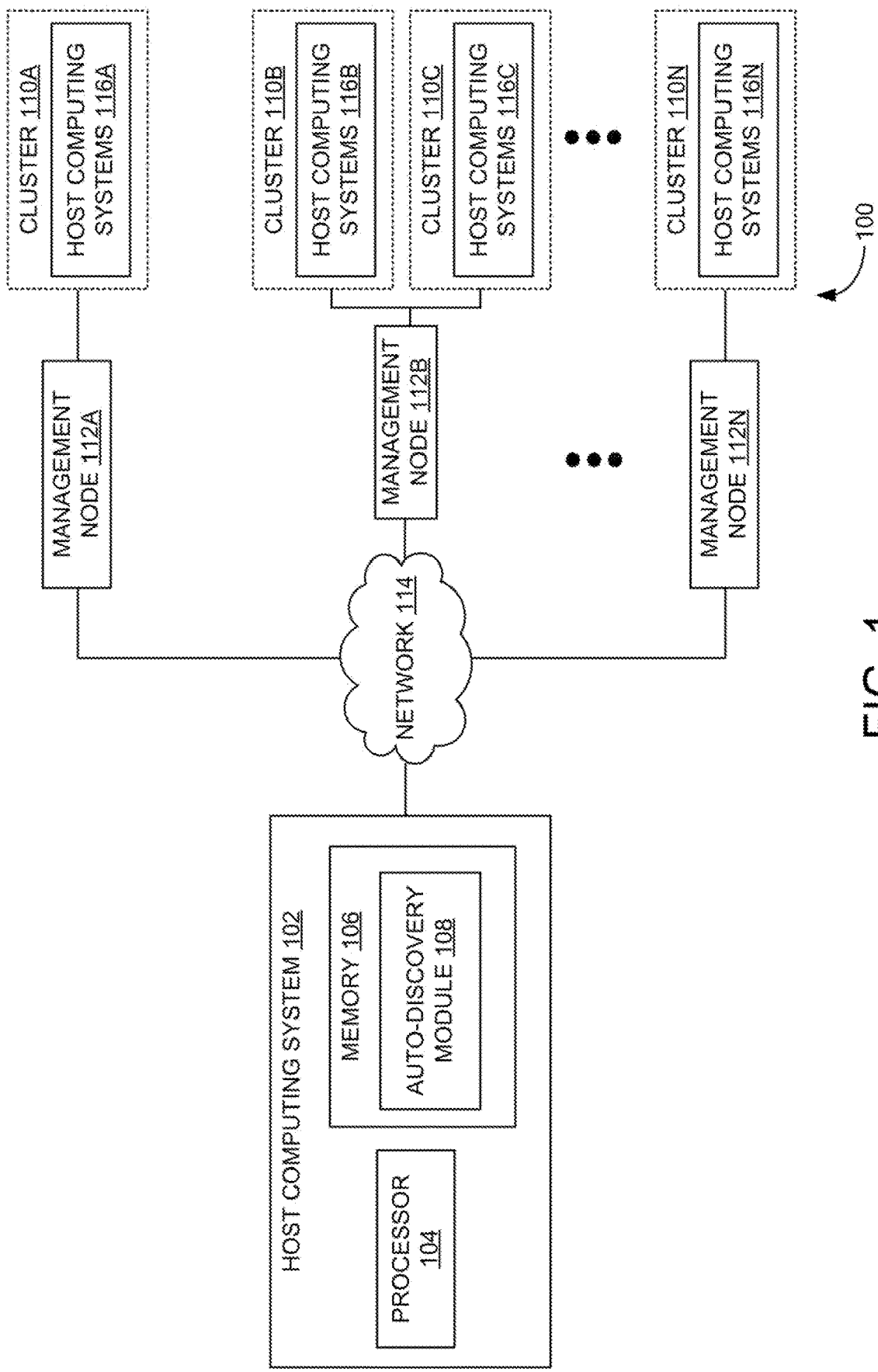
FIG. 1 is a block diagram of an example host computing system, including an auto discovery module to enable the host computing system to add to a cluster in a data center.

The drawings described herein are for illustration purposes only and are not intended to limit the scope of the present subject matter in any way.

DETAILED DESCRIPTION

The term "virtual computing instance (VCI)" may cover a range of computing functionality. Vas may include non-virtualized physical hosts, virtual machines (VMs), and/or containers. Containers can run on a host operating system without a hypervisor or separate operating system, such as a container that runs within Linux. A container can be provided by a VM that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

The VMs, in some examples, may operate with their own guest operating systems on a host computing system using resources of the host virtualized by virtualization software (e.g., a hypervisor, VM monitor, and the like). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers.

Multiple Vas can be configured to be in communication with each other in a distributed computing system (e.g., a software defined data center). In such software defined data centers, multiple servers (i.e., hosts or host computing systems or host nodes) can be clustered together to create clusters and/or workload domains of shared compute and storage resources. For example, a group of host computing systems may be pooled together to share resources in managing the plurality of virtual machines (VMs) in a cluster. Thus, virtualization and clustering may allow a computing system to perform a job of multiple computing systems by abstracting computer resources such as hardware and sharing these resources across multiple environments.

In some examples, a management node (i.e., a management server) may be assigned to a cluster or a set of clusters. The management node may provide centralized control of the cluster/clusters and provide essential data center services such as access control, performance monitoring, configuration, or the like. Thus, the management node may unify the resources from the individual host computing system to be shared among virtual machines in the software defined data center.

In such scenarios, host computing systems may be added to the cluster to facilitate enterprise's needs. The process of assigning a management node (e.g., a vCenter server, which is a centralized management utility for VMware®) to a host computing system (e.g., an enterprise-class, type-1 hypervisor (ESXi) server) may require a user to login to an user interface (UI) of the management node and follow a set of steps. Example process to add the host computing system to the management node may include login to the UI of a target management node, selecting a target cluster or data center managed by the target management node, enter the host details (e.g., host internet protocol (IP), username, and password) under the selected cluster or data center, and verify the trust certificate. Upon verification, the host computing system may be added to the cluster managed by the management node.

Thus, the process to add the host computing system to the cluster may require manual provisioning of the host computing system to the cluster based on cluster type and/or workload requirements. For example, a user, such as an information technology (IT) administrator may be required to provision the host computing system manually based on a cluster type and/or workload priority requirement. In this example, manually provisioning the host computing system can be a time-consuming process, particularly, when a user/customer wants to expand the data center and have multiple host computing systems to add to the data center. Further, the user may have to manually check resource utilization of each cluster and then manually provision the host computing system to the cluster. Any mistake in provisioning of the host computing system to the cluster can impact the data centre operation and may significantly increase down-time.

Examples described herein may enable a host computing system to automatically get discovered and placed in a cluster managed by a management node without manual intervention. The host computing system may include an auto-discovery module to broadcast a message to a set of management nodes in a data center. The message may indicate an existence of the host computing system and include a configuration policy. Further, the auto-discovery module may receive an acknowledgment message from a management node. The acknowledgment message may indicate that the management node supports the configuration policy. Furthermore, the auto-discovery module may establish a trust relationship with the management node in response to receiving the acknowledgment message. Upon establishing the trust relationship, the auto-discovery module may enable the host computing system to add to a cluster managed by the management node. Thus, examples described herein may automatically place new host computing systems under different management nodes and facilitate seem-less scaling up of the data centers.

In the following description, for purposes of explanation, numerous specific details are set forth to provide a thorough understanding of the present techniques. It will be apparent, however, to one skilled in the art that the present apparatus, devices, and systems may be practiced without these specific details. Reference in the specification to "an example" or similar language means that a particular feature, structure, or characteristic described is included in at least that one example, but not necessarily in other examples.

Turning now to the figures, FIG. 1 is a block diagram of an example host computing system 102, including an auto-discovery module 108 to enable host computing system 102 to add to a cluster (e.g., one of clusters 110A to 110N) in a data center 100. Example data center 100 may be a software defined data center. The software defined data center may be a pool or collection of cloud infrastructure resources designed for enterprise needs. Further, the software defined data center may be a virtual representation of a physical data center, complete with servers, storage clusters, and networking components, all of which may reside in virtual space being hosted by one or more physical data centers.

As shown in FIG. 1, data center 100 may include multiple clusters (e.g., 110A to 110N) of host computing systems 116A to 116N. For example, host computing systems 116A are associated with cluster 110A, host computing systems 116B are associated with cluster 110B, host computing systems 116C are associated with cluster 110C, and host computing systems 116N are associated with cluster 110N. Example host computing system (e.g., 116A to 116N) may be a physical computer executing different workloads such as virtual machines, containers, and/or the like. The physical computer may be a hardware-based device (e.g., a personal computer) including an operating system (OS) and executing applications. A virtual machine may operate with its own guest OS on the physical computer using resources of the physical computer virtualized by virtualization software (e.g., a hypervisor, a virtual machine monitor, and the like). A container may be a data computer node that runs on top of a host OS without the need for a hypervisor or separate OS. In some examples, each host computing system may run a hypervisor that creates and runs virtual machines.

In some examples, a management node (e.g., 112A to 112N) may be assigned to one or more clusters 110A to 110N. For example, management node 112A may be assigned to cluster 110A, management node 112B may be assigned to clusters 110B and 110C, and management node 112N may be assigned to cluster 110N. Example management node (e.g., 112A to 112N) may execute centralized management services that may be interconnected to manage corresponding host computing systems 116A to 116N centrally in the virtualized cloud computing infrastructure. Example centralized management service may be a part of vCenter Server™ and vSphere® program products, which are commercially available from VMware®.

Further, clusters 110A to 110N may be communicatively coupled in data center 100 via a network 114. Example network 114 can be a managed Internet protocol (IP) network administered by a service provider. For example, network 114 may be implemented using wireless protocols and technologies, such as Wi-Fi, WiMax, and the like. In other examples, network 114 can also be a packet-switched network such as a local area network, wide area network, metropolitan area network, Internet network, or other similar type of network environment. In yet other examples, network 114 may be a fixed wireless network, a wireless local area network (LAN), a wireless wide area network (WAN), a personal area network (PAN), a virtual private network (VPN), intranet or other suitable network system and includes equipment for receiving and transmitting signals.

As shown in FIG. 1, host computing system 102 may be configured to add to data center 100. Examples described herein may enable host computing system 102 to automatically add to one of clusters 110A to 110N in data center 100. Host computing system 102 may include a processor 104 and a memory 106 coupled to processor 104. In an example, memory 106 may include auto-discovery module 108.

During operation, auto-discovery module 108 may initiate installation of a virtualization software on host computing system 102 to support execution of a virtual computing instance. Further, auto-discovery module 108 may provide a user-selectable option on a user interface during the installation. In an example, the user-selectable option may cause host computing system 102 to be automatically discovered and assigned to one of a set of management nodes (e.g., 112A to 112N).

Further, auto-discovery module 108 may broadcast the message to set of management nodes 112A-112N in data center 100. In an example, auto-discovery module 108 may broadcast a message in response to the selection of the option. Example message may include a configuration policy. The configuration policy may include at least one parameter selected from a group consisting of central processing unit (CPU) information, memory information, storage information, network connectivity information, and a user-defined custom label or tag. The user-defined custom label may be associated with at least one configuration data specific to host computing system 102.

In an example, auto-discovery module 108 may broadcast the message in response to a determination that host computing system 102 is connected to a data center network and assigned an internet protocol (IP) address. The term "data center network" may refer to an arrangement of network devices such as routers, switches, interfaces, and the like that inter-connects various computing and storage units in a data center's resource pool to ensure a high-level of performance.

Further, auto-discovery module 108 may receive an acknowledgment message from a management node (e.g., 112A). Example acknowledgment message may indicate that management node 112A supports the configuration policy. In an example, auto-discovery module 108 may select management node 112A from which the acknowledgment message is received based on a defined policy. Example scenario of receiving the acknowledgement message from multiple management nodes is described in FIG. 5.

Furthermore, auto-discovery module 108 may establish a trust relationship with management node 112A in response to receiving the acknowledgment message from management node 112A. In an example, auto-discovery module 108 may transmit a trust certificate to management node 112A. Further, auto-discovery module 108 may establish the trust relationship with management node 112A in response to a validation of the trust certificate by management node 112A. For example, the trust certificate can be a secure sockets layer (SSL) certificate and the trust relationship may be established using an SSL handshake exchange using the SSL certificate.

In an example, when the acknowledgment message is received from more than one management node, then auto-discovery module 108 may select one of the management nodes from which the acknowledgment message is received based on the defined policy (e.g., a first come first serve basis, a priority basis, or the like). In this example, auto-discovery module 108 may establish the trust relationship with management node 112A. Furthermore, auto-discovery module 108 may enable host computing system 102 to add to cluster 110A managed by management node 112A upon establishing the trust relationship.

In some examples, the functionalities described in FIG. 1, in relation to instructions to implement functions of auto-discovery module 108 and any additional instructions described herein in relation to the storage medium, may be implemented as engines or modules including any combination of hardware and programming to implement the functionalities of the modules or engines described herein. The functions of auto-discovery module 108 may also be implemented by a respective processor. In examples described herein, the processor may include, for example, one processor or multiple processors included in a single device or distributed across multiple devices.

Figure 2A:
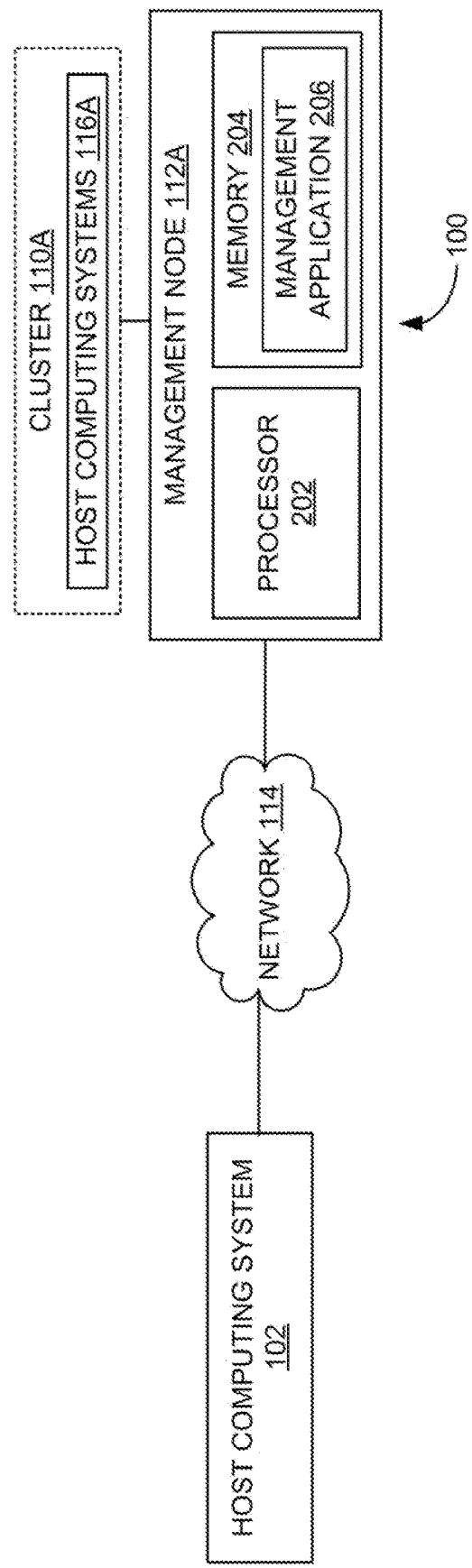
FIG. 2A is a block diagram of an example management node, including a management application to add a host computing system to a cluster.

FIG. 2A is a block diagram of an example management node (e.g., management node 112A of FIG. 1), including a management application 206 to add a host computing system (e.g., host computing system 102 of FIG. 1) to a cluster (e.g., cluster 110A of FIG. 1). For example, similarly named elements of FIG. 2A may be similar in structure and/or function to elements described with respect to FIG. 1. As shown in FIG. 2A, management node 112A may include a processor 202 and a memory 204 coupled to processor 202. In an example, memory 204 may include management application 206 to manage cluster 110A of host computing systems (e.g., host computing systems 116A of FIG. 1) in a data center (e.g., data center 100 of FIG. 1).

In an example, management application 206 may receive a broadcast message from host computing system 102 connected to data center network 114. Example broadcast message may include a configuration policy. Further, management application 206 may determine that management node 112A supports the configuration policy. Furthermore, management application 206 may transmit an acknowledgment message to host computing system 102. Example acknowledgment message may indicate that management node 112A supports the configuration policy. In an example, management application 206 may:

identify a plurality of features of cluster 110A. The plurality of features may define requirements for host computing system 102 to be part of cluster 110A. In an example, when a management node is associated multiple clusters, then features of each of the clusters may be identified.

perform a compatibility analysis to match the configuration policy with the requirements of the identified features. The configuration policy may include information associated with at least one of a central processing unit (CPU) resource, a memory resource, a storage resource, a network resource, and a user-defined custom label. In the example of management node associated with multiple clusters, the compatibility analysis may be performed corresponding to each cluster. Further, example compatibility analysis may include matching resources available at host computing system 102 with the requirements of the identified features.

transmit the acknowledgment message to host computing system 102 based on the compatibility analysis.

Further, management application 206 may receive a trust message including information to establish a trust relationship with host computing system 102 in response to the acknowledgment message. Furthermore, management application 206 may establish the trust relationship with host computing system 102 based on the information. In an example, management application 206 may:

verify the information received from host computing system 102. Example information may include a trust certificate.

establish the trust relationship with host computing system 102 upon the verification.

Furthermore, management application 206 may execute a command to add host computing system 102 to cluster 110A upon establishing the trust relationship.

Figure 2B:
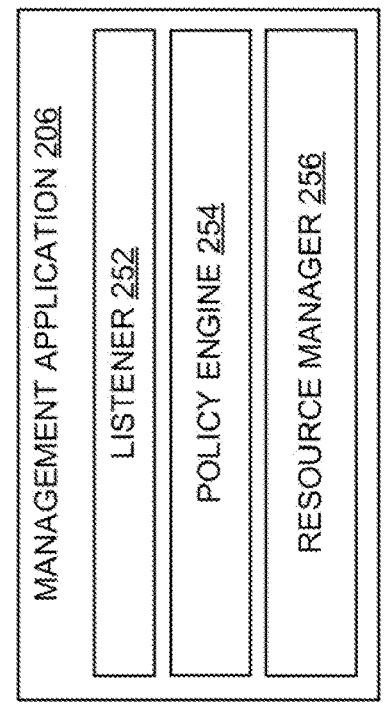
FIG. 2B is a block diagram of the example management application of FIG. 2A, depicting additional features.

FIG. 2B is a block diagram of example management application 206 of FIG. 2A, depicting additional features. For example, similarly named elements of FIG. 2B may be similar in structure and/or function to elements described with respect to FIG. 2A. As shown in FIG. 2B, management application 206 may include a listener 252, a policy engine 254, and a resource manager 256. In an example, listener 252 may passively monitor objects in data center 100. Example listener 252 may receive the message broadcasted by host computing system 102. Further, listener 252 may notify policy engine 254 upon receiving the message. Thus, listener 252 may provide an interface between host computing system 102 and management node 112A.

Example policy engine 254 may provide policy management and policy enforcement corresponding to management node 112A. In an example, policy engine 254 may retrieve the configuration policy from the message and determine whether management node 112A supports the configuration policy. For example, policy engine 254 may go through an inventory of policies corresponding to management node 112A and analyze the configuration policy based on the policies to determine that management node 112A supports the configuration policy. Further, policy engine 254 may inform listener 252 that management node 112A supports the configuration policy. Furthermore, listener 252 may transmit the acknowledgment message to host computing system 102 to indicate that management node 112A supports the configuration policy.

In an example, resource manager 256 may execute a command to add host computing system 102 to cluster 110A managed by management node 112A upon establishing the trust relationship with host computing system 102. Further, resource manager 256 may initiate managing host computing system 102. Example sequence of events between host computing system 102, listener 252, policy engine 254, and resource manager 256 is described in FIG. 3.

In some examples, the functionalities described in FIG. 2B, in relation to instructions to implement functions of listener 252, policy engine 254, resource manager 256, and any additional instructions described herein in relation to the storage medium, may be implemented as engines or modules including any combination of hardware and programming to implement the functionalities of the modules or engines described herein. The functions of listener 252, policy engine 254, and resource manager 256 may also be implemented by a respective processor. In examples described herein, the processor may include, for example, one processor or multiple processors included in a single device or distributed across multiple devices.

Figure 3:
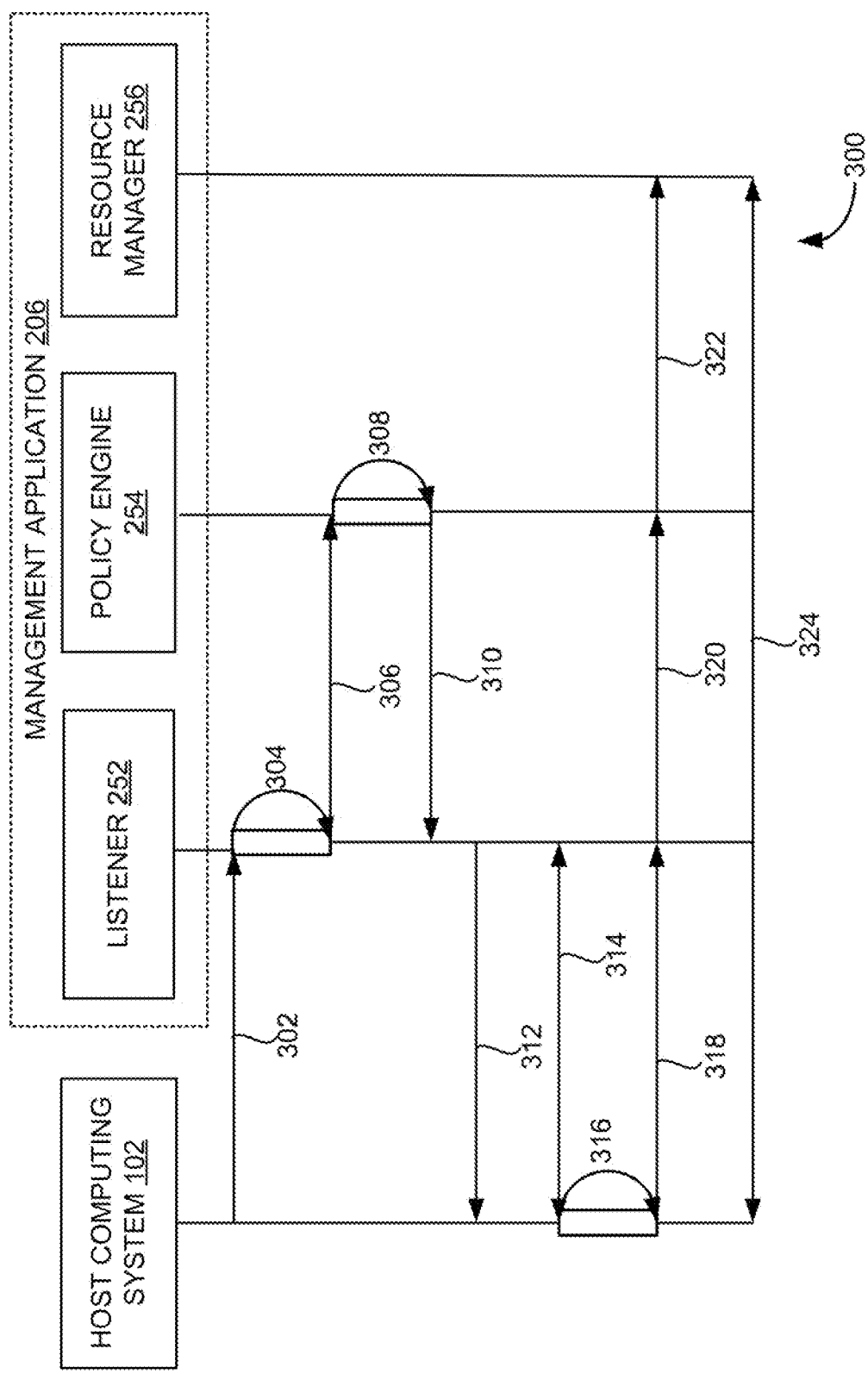
FIG. 3 is a sequence diagram illustrating a sequence of events to add a host computing system to a cluster managed by a management node.

FIG. 3 is a sequence diagram 300 illustrating a sequence of events to add a host computing system (e.g., host computing system 102 of FIGS. 1 and 2A) to a cluster (e.g., cluster 110A of FIGS. 1 and 2A) managed by a management node (e.g., management node 112A of FIGS. 1 and 2A). For example, similarly named elements of FIG. 3 may be similar in structure and/or function to elements described with respect to FIGS. 1, 2A, and 2B. Example sequence diagram 300 may represent the interactions and the operations involved in adding host computing system 102 to cluster 110A managed by management node 112A. FIG. 3 illustrates process objects including host computing system 102, listener 252, policy engine 254, and resource manager 256 along with their respective vertical lines originating from them. The vertical lines of host computing system 102, listener 252, policy engine 254, and resource manager 256 may represent the processes that may exist simultaneously. The horizontal arrows (e.g., 302, 306, 310, 312, 314, 318, 320, 322, and 324) may represent the data flow steps between the vertical lines originating from their respective process objects (for e.g., host computing system 102, listener 252, policy engine 254, and resource manager 256). Further, activation boxes (e.g., 304, 308, and 316) between the horizontal arrows may represent the process that is being performed in the respective process object.

At 302, host computing system 102 may broadcast a message to a set of management nodes in a data center. In an example, the message may include a configuration policy. At 304, listener 252 may receive the broadcast message from host computing system 102. Further, listener 252 may transmit the configuration policy to policy engine 254, at 306. At 308, policy engine 254 may determine that management node 112A supports the configuration policy. Furthermore, policy engine 254 may inform listener 252 that management node 112A supports the configuration policy, at 310.

At 312, listener 252 may transmit an acknowledgment message to host computing system 102. Example acknowledgment message may indicate that management node 112A supports the configuration policy. At 314, in response to the acknowledgment message, a trust relationship may be established between host computing system 102 and management node 112A via listener 252. In an example, the trust relationship may be established using a handshake protocol exchange such as a secure sockets layer (SSL) handshake protocol exchange, a transport layer security (TLS) handshake protocol exchange, or the like. The SSL/TLS handshake may be a negotiation between host computing system 102 and management node 112A to establish details of their connection. The SSL/TLS handshake may determine what version of SSL/TLS can be used in a session, which cipher suite may encrypt communication, and establishes that a secure connection is in place before transferring data.

At 316, an administrator session may be generated at host computing system 102 based on the trust relationship. Example administrator session may be generated to connect to management node 112A. At 318, session details may be communicated to listener 252 by host computing system 102. At 320, listener 252 may communicate to policy engine 254 to apply a policy corresponding to host computing system 102. At 322, policy engine 254 may raise a request to add host computing system 102 with resource manager 256. At 324, resource manager 256 may execute a command to add host computing system 102 to cluster 110A managed by management node 112A. Thus, host computing system 102 may be added to cluster 110A and resource manager 256 may initiate managing host computing system 102.

Figure 4:
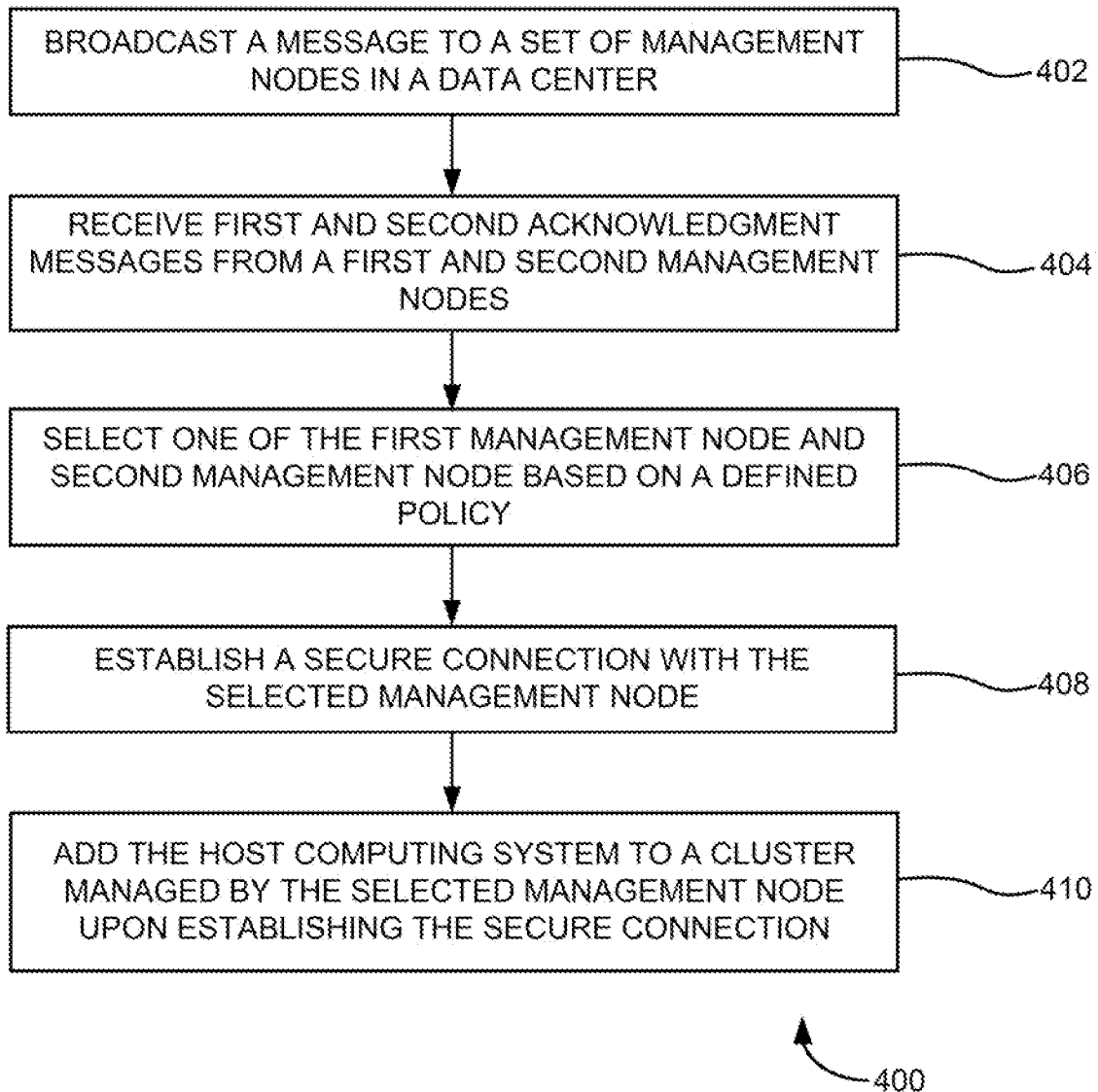
FIG. 4 is a flowchart illustrating an example method for adding a host computing system to a cluster.

FIG. 4 is a flowchart illustrating an example method 400 for adding a host computing system to a cluster. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, a message may be broadcasted to a set of management nodes in a data center. Example message may indicate an existence of the host computing system. Further, the message may be broadcasted upon the host computing system is connected to a data center network and assigned an internet protocol (IP) address. Example message may include an internet protocol (IP) address and a configuration policy of the host computing system. In an example, prior to broadcasting the message, method 400 may include:

- initiating installation of a virtualization software on the host computing system to support execution of a virtual computing instance. In an example, the virtualization software can be installed as system level software directly on a host computing system hardware (i.e., often referred to as "bare metal" installation). A bare metal computing system can be a computer system on which a general-purpose operating system (such as Microsoft Windows® or Linux™) has not yet been installed. For example, a general-purpose operating system may be first installed on the bare metal computer system and then the virtualization software may be installed.
- providing a user-selectable option on a user interface during the installation. The user-selectable option may cause the host computing system to be discovered and assigned to one of the management nodes. The message is broadcasted in response to the selection of the option.

At 404, in response to broadcasting the message, first and second acknowledgment messages may be received from a first and second management nodes, respectively. Example first and second acknowledgment messages may indicate an availability of the first and second management nodes, respectively, to accommodate the host computing system in a respective cluster.

At 406, one of the first management node and second management node may be selected based on a defined policy in response to receiving the first and second acknowledgment messages. For example, the defined policy may include a first come first serve basis, a priority basis, or the like.

At 408, a secure connection may be established with the selected management node. In an example, establishing the secure connection with the selected management node may include establishing the secure connection between the host computing system and the selected management node in accordance with a handshake protocol exchange. Example handshake protocol exchange may include a secure sockets layer (SSL) handshake protocol exchange, a transport layer security (TLS) handshake protocol exchange, or the like. At 410, the host computing system may be added to a cluster managed by the selected management node upon establishing the secure connection.

Figure 5:
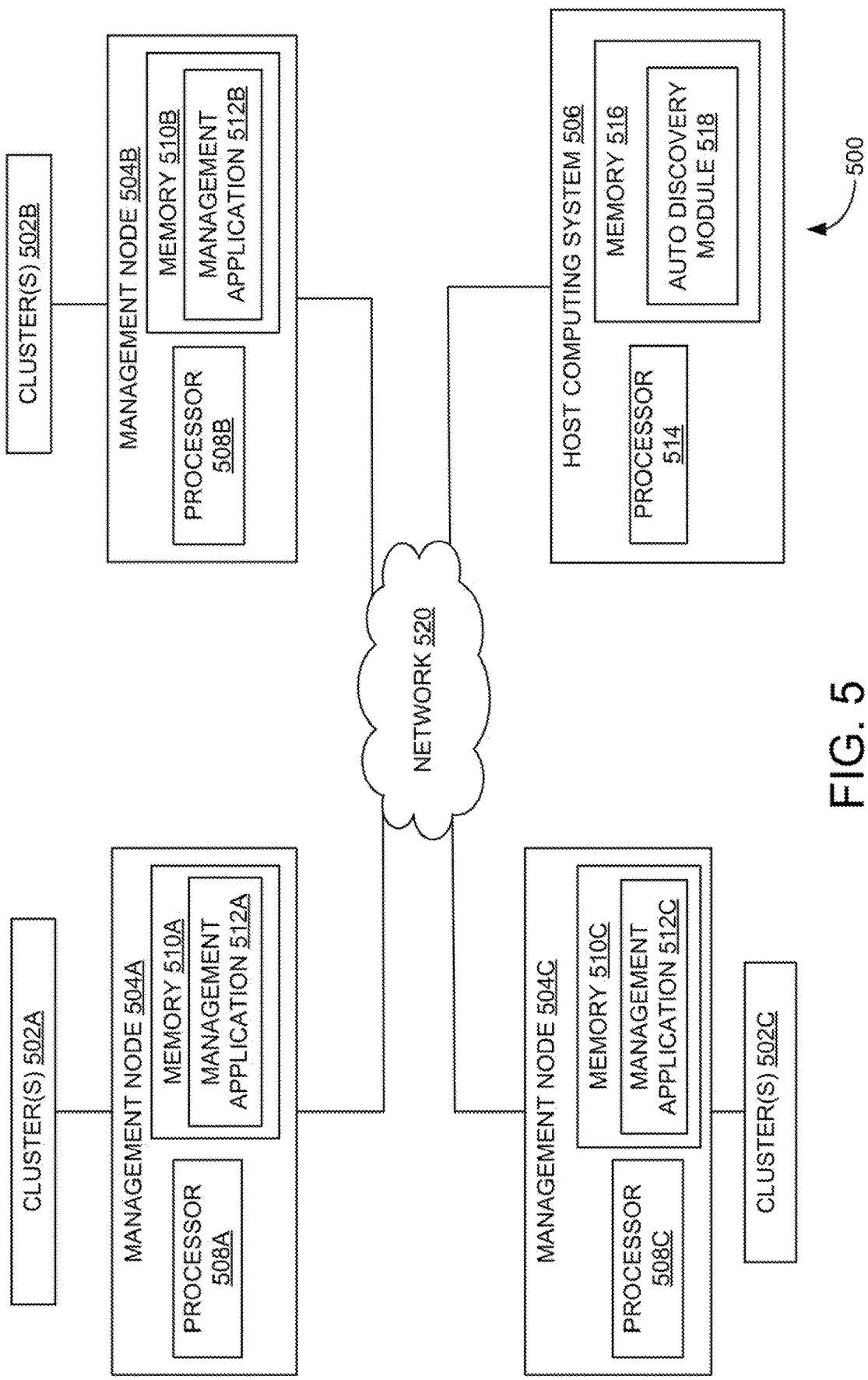
FIG. 5 is a block diagram of an example data center illustrating addition of a host computing system to a cluster managed by a selected management node.

FIG. 5 is a block diagram of an example data center 500 illustrating addition of a host computing system 506 to a cluster (e.g., 502A, 502B, and 502C) managed by a selected management node. Example data center 500 may include multiple clusters 502A, 502B, and 502C of host computing systems communicatively connected via a network 520. Further, clusters (e.g., 502A, 502B, and 502C) may be managed by corresponding management nodes 504A, 504B, and 504C. For example, clusters 502A may be managed by management node 504A, clusters 504B may be managed by management node 504B, and clusters 504C may be management node 504C. Each management node 504A, 504B, and 504C may include a respective processor (e.g., 508A, 508B, and 508C) and a respective memory (e.g., 510A, 510B, and 510C). In an example, memories 510A, 510B, and 510C may include corresponding management applications 512A, 512B, and 512C.

In an example, host computing system 506 may be configured to get connected to data center 500 via network 520. Example host computing system 506 may include a processor 514 and a memory 516. In an example, memory 516 may include an auto-discovery module 518. In an example, auto-discovery module 518 may broadcast a message upon connecting host computing system 506 to network 520 and assigned an internet protocol (IP) address. Example message may indicate an existence of host computing system 506. Accordingly, management nodes 504A, 504B, and 504C may receive the broadcasted message.

Upon receiving the message, management nodes 504A, 504B, and 504C may determine whether they can support a configuration policy of host computing system 506 using corresponding management applications 512A, 512B, and 512C. For example, consider management nodes 504A and 504B support the configuration policy and management node 504C does not support the configuration policy. In this example, management applications 512A and 512B associated with management nodes 504A and 504B, respectively, may send acknowledgement messages to host computing system 506. Example acknowledgment messages may indicate an availability of management nodes 504A and 504B, respectively, to accommodate host computing system 506 in respective clusters 502A and 502B.

Further, host computing system 506 may receive the acknowledgement messages from management nodes 504A and 504B. In an example, host computing system 506 may select one of management nodes 504A and 504B based on a defined policy (e.g., a first come first serve (FCFS) basis, a priority basis, or the like). For example, when the defined policy is first come first serve basis, the management node which will be the first to acknowledge its availability may be selected by host computing system 506. In this example, consider host computing system 506 has selected management node 504A. Upon selection, a secure connection may be established between selected management node 504A and host computing system 506. Furthermore, host computing system 506 may be added to cluster 502A managed by management node 504A upon establishing the secure connection via management application 512A.

Figure 6:
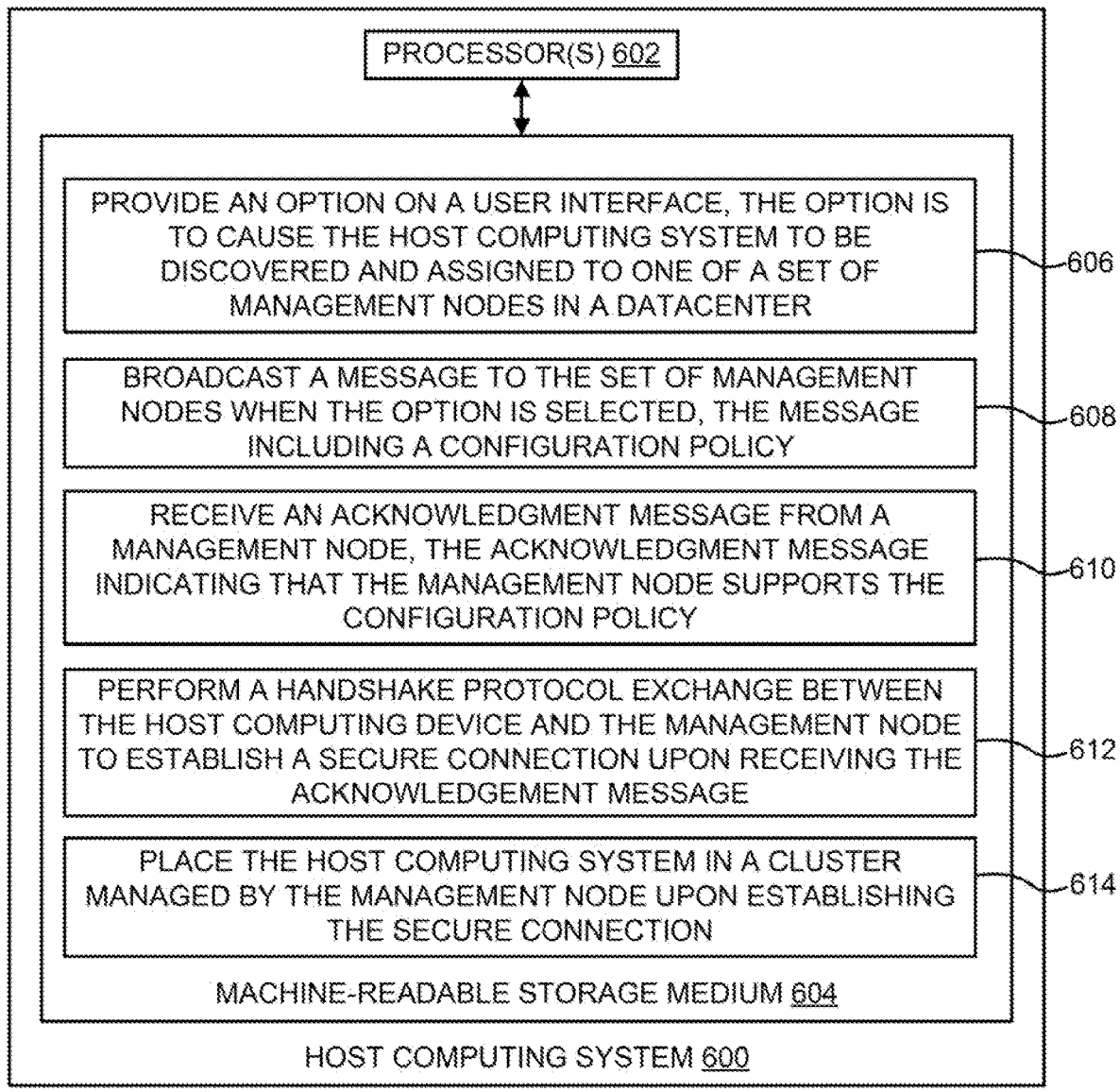
FIG. 6 is a block diagram of an example host computing system including non-transitory machine-readable storage medium storing instructions to place the host computing system in a cluster managed by a management node.

FIG. 6 is a block diagram of an example host computing system 600 including non-transitory machine-readable storage medium storing instructions to place host computing system 600 in a cluster managed by a management node. Host computing system 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604.

Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to host computing system 600.

Machine-readable storage medium 604 may store instructions 606-614. In an example, instructions 606-614 may be executed by processor 602 to place host computing system 600 in a cluster managed by a management node. Instructions 606 may be executed by processor 602 to provide an option on a user interface. The option may cause host computing system 600 to be discovered and assigned to one of a set of management nodes in a data center. In an example, the option may be provided during installation of a virtualization software on host computing system 600. Example virtualization software may include a hypervisor to support execution of a virtual computing instance.

Instructions 608 may be executed by processor 602 to broadcast a message to the set of management nodes when the option is selected. Example message may include a configuration policy. In an example, instructions to broadcast the message to the set of management nodes may include instructions to broadcast the message to the set of management nodes in response to a determination that host computing system 600 is connected to a data center network and assigned an internet protocol (IP) address.

Instructions 610 may be executed by processor 602 to receive an acknowledgment message from a management node in response to broadcasting the message. Example acknowledgment message may indicate that the management node supports the configuration policy.

Instructions 612 may be executed by processor 602 to perform a handshake protocol exchange between the host computing device and the management node to establish a secure connection upon receiving the acknowledgement message. In an example, the handshake protocol exchange may include a secure sockets layer (SSL) handshake protocol exchange, a transport layer security (TLS) handshake protocol exchange, or the like. Further, instructions 614 may be executed by processor 602 to place host computing system 600 in a cluster managed by the management node upon establishing the secure connection.

Figure 7:
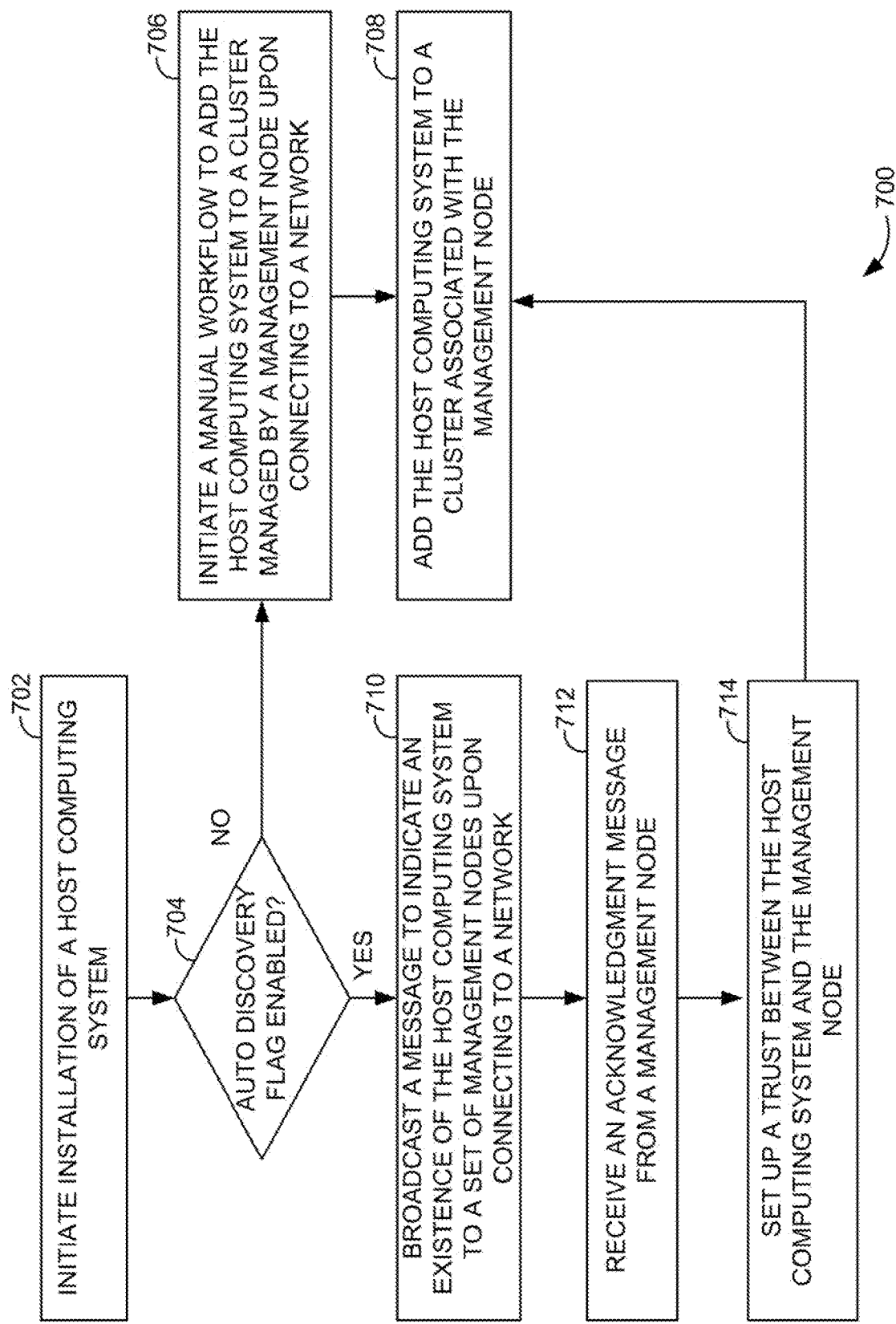
FIG. 7 is a flowchart illustrating an example method for enabling a host computing system to be auto discovered and placed in a cluster associated with a management node.

FIG. 7 is a flowchart illustrating an example method 700 for enabling a host computing system to be auto discovered and placed in a cluster associated with a management node. At 702, installation of a host computing system may be initiated. For example, a user may initiate installing of a virtualization software (e.g., ESXi hypervisor) on a bare metal hardware (e.g., the host computing system) in a data center. In an example, during installation, an auto-discover flag may be provided to the user via a user interface. Example auto-discover flag may enable the host computing system to get auto-discovered and assigned a management node (e.g., vCenter server) once the host computing system is connected to a network of the data center. Further, the user can enable or disable the auto-discover flag and continue with the process of the installation. Upon installation, the host computing system may be connected to the network and be allocated an internet protocol (IP) address. For example, the IP address may be a static IP address or a dynamic IP address. The static IP address may allow the host computing system to retain the same IP address. The dynamic IP address may be dynamically assigned using dynamic host configuration protocol (DHCP).

At 704, a check may be made to determine whether the auto-discover flag is enabled. When the auto-discover flag is disabled, a manual workflow may be initiated to add the host computing system to a cluster upon connecting to the network, at 706. At 708, the host computing system may be added to the cluster associated with the management node.

When the auto-discover flag is enabled, the host computing system may broadcast a message in the data center upon connecting to the network, at 710. The message may notify management nodes in the data center about the existence/presence of the host computing system. Example message may include the IP address of the host computing system along with configuration parameters such as storage, memory, and the like as payload. The IP address may act as a unique identifier for identifying the host computing system while the configuration parameters may be required for the management nodes to check their suitability for accommodating the host computing system. Thus, the management nodes may be notified of the host computing system and the management nodes may resend back with their availability to accommodate the host computing system in their fleet or cluster via an acknowledgement message.

At 712, the host computing system may receive the acknowledgement message from a management node. In some examples, when there is no management node currently installed, the host computing system may remain in an orphaned state. Further, when the host computing system is restarted and the auto discover flag was turned on during installation, then the host computing system may again broadcast the message to the management nodes. In this example, if a management node is added in this time, then the management node may send the acknowledgement message to the host computing system if the management node can accommodate the host computing system. Thus, the orphan host computing system (i.e., the host computing system not connected to any cluster), installed with auto-discovery flag turned on, may get the capability to broadcast its availability on every restart.

At 714, a trust relationship between the host computing system and the management node may be set up. For example, the host computing system may send a reverse acknowledgment to management node which may establish the trust relationship between the management node and the host computing system. For example, during the trust setup, a trust certificate of the host computing system may be verified. Upon establishing the trust relationship, the host computing system may get added to an inventory or cluster of the management node, at 708.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on."

Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A host computing system comprising:
a processor; and
a memory coupled to the processor, wherein the memory comprises an auto-discovery module executable by the processor to:
broadcast a message to a set of management nodes in a data center, the message including a configuration policy of the host computing system;
receive an acknowledgment message from a management node, the acknowledgment message indicating that the management node supports the configuration policy of the host computing system;
establish a trust relationship with the management node in response to receiving the acknowledgment message; and
enable the host computing system to add to a cluster managed by the management node upon establishing the trust relationship.

2. The host computing system of claim 1, wherein the auto-discovery module is to:
initiate installation of a virtualization software on the host computing system to support execution of a virtual computing instance;
provide a user-selectable option on a user interface during the installation, wherein the user-selectable option is to cause the host computing system to be discovered and assigned to one of the management nodes; and
broadcast the message in response to the selection of the option.

3. The host computing system of claim 1, wherein the auto-discovery module is to:
broadcast the message in response to a determination that the host computing system is connected to a data center network and assigned an internet protocol (IP) address.

4. The host computing system of claim 1, wherein the configuration policy comprises at least one parameter selected from a group consisting of central processing unit (CPU) information, memory information, storage information, network connectivity information, and a user-defined custom label.

5. The host computing system of claim 1, wherein the auto-discovery module is to:
select the management node from which the acknowledgment message is received based on a defined policy; and
establish the trust relationship with the selected management node.

6. The host computing system of claim 1, wherein the auto-discovery module is to:
transmit a trust certificate to the management node; and
establish the trust relationship with the management node in response to a validation of the trust certificate by the management node.

7. A management node in a data center comprising:
a processor; and
a memory coupled to the processor, wherein the memory comprises a management application to manage a cluster of host computing systems in a data center, the management application to:
receive a broadcast message from a host computing system connected to a data center network, the broadcast message including a configuration policy of the host computing system;
determine that the management node supports the configuration policy of the host computing system;
transmit an acknowledgment message to the host computing system, Wherein the acknowledgment message is to indicate that the management node supports the configuration policy of the host computing system;
receive a trust message including information to establish a trust relationship with the host computing system in response to the acknowledgment message;
establish the trust relationship with the host computing system based on the information; and
execute a command to add the host computing system to the cluster upon establishing the trust relationship.

8. The management node of claim 7, wherein the management application is to:
verify the information received from the host computing system, the information including a trust certificate; and
establish the trust relationship with the host computing system upon the verification.

9. The management node of claim 7, wherein the management application is to:
identify a plurality of features of the cluster, the plurality of features defining requirements for the host computing system to be part of the cluster;
perform a compatibility analysis to match the configuration policy with the requirements of the identified features, wherein the configuration policy comprises information associated with at least one of a central processing unit (CPU) resource, a memory resource, a storage resource, a network resource, and a user-defined custom label; and
transmit the acknowledgment message to the host computing system based on the compatibility analysis.

10. The management node of claim 7, wherein the data center is a software defined data center.

11. A method implemented by instructions executed by a processor of a host computing system, the method comprising:
broadcasting a message to a set of management nodes in a data center, wherein the message is to indicate an existence of the host computing system;
in response to broadcasting the message, receiving first and second acknowledgment messages from a first and second management nodes, respectively, the first and second acknowledgment messages indicating an availability of the first and second management nodes, respectively, to accommodate the host computing system in a respective duster;
selecting one of the first management node and second management node bases on a defined policy in response to receiving the first and second acknowledgment messages;
establishing a secure connection with the selected management node; and
adding the host computing system to a cluster managed by the selected management node upon establishing the secure connection.

12. The method of claim 11, further comprising:
prior to broadcasting the message, initiating installation of a virtualization software on the host computing system to support execution of a virtual computing instance; and providing a user-selectable option on a user interface during the installation, wherein the user-selectable option is to cause the host computing system to be discovered and assigned to one of the management nodes, and wherein the message is broadcasted in response to the selection of the option.

13. The method of claim 11, Wherein the message is broadcasted upon the host computing system is connected to a data center network and assigned an internet protocol (IP) address.

14. The method of claim 11, wherein the message comprises an internet protocol (IP) address and a configuration policy of the host computing system.

15. The method of claim 11, wherein establishing the secure connection with the selected management node comprises:

establishing the secure connection between the host computing system and the selected management node in accordance with a handshake protocol exchange.

16. The method of claim 11, wherein the defined policy comprises a first come first serve basis or a priority basis.

17. A non-transitory machine-readable storage medium encoded with instructions that, when executed by a processor of a host computing device, cause the processor to:

provide an option on a user interface, wherein the option is to cause the host computing system to be discovered and assigned to one of a set of management nodes in a data center;

broadcast a message to the set of management nodes when the option is selected, the message including a configuration policy;

in response to broadcasting the message, receive an acknowledgment message from a management node, the acknowledgment message indicating that the management node supports the configuration policy;

perform a handshake protocol exchange between the host computing device and the management node to establish a secure connection upon receiving the acknowledgement message; and place the host computing system in a cluster managed by the management node upon establishing the secure connection.

18. The non-transitory machine-readable storage medium of claim 17, wherein instructions to broadcast the message to the set of management nodes comprise instructions to:

broadcast the message to the set of management nodes in response to a determination that the host computing system is connected to a data center network and assigned an internet protocol (IP) address.

19. The non-transitory machine-readable storage medium of claim 17, wherein the handshake protocol exchange comprises a secure sockets layer (SSL) handshake protocol exchange or a transport layer security (TLS) handshake protocol exchange.

20. The non-transitory machine-readable storage medium of claim 17, wherein the option is provided during installation of a virtualization software on the host computing system, the virtualization software comprising a hyper-visor to support execution of a virtual computing instance.

* * * * *